United States Patent
Tanaka

(10) Patent No.: US 9,241,357 B2
(45) Date of Patent: Jan. 19, 2016

(54) ELECTRONIC DEVICE, METHOD, AND COMPUTER-READABLE STORAGE MEDIUM

(71) Applicant: KABUSHIKI KAISHA TOSHIBA, Minato-ku, Tokyo (JP)

(72) Inventor: Koichi Tanaka, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 117 days.

(21) Appl. No.: 13/929,210

(22) Filed: Jun. 27, 2013

(65) Prior Publication Data
US 2015/0003432 A1   Jan. 1, 2015

(51) Int. Cl.
*H04W 76/02*    (2009.01)
*H04W 36/34*    (2009.01)

(52) U.S. Cl.
CPC ........... *H04W 76/021* (2013.01); *H04W 36/34* (2013.01)

(58) Field of Classification Search
CPC ............... H04W 76/00–76/068; H04W 40/36
USPC .................................................. 370/310–350
See application file for complete search history.

(56) References Cited

U.S. PATENT DOCUMENTS

| | | | |
|---|---|---|---|
| 2008/0181180 A1* | 7/2008 | Karaoguz | 370/331 |
| 2011/0040899 A1 | 2/2011 | Yepez et al. | |
| 2011/0040900 A1 | 2/2011 | Yepez et al. | |
| 2013/0148568 A1* | 6/2013 | Iimori | 370/315 |
| 2013/0331028 A1* | 12/2013 | Kuehnel et al. | 455/41.1 |
| 2014/0071968 A1* | 3/2014 | Raniere | 370/338 |
| 2014/0113631 A1* | 4/2014 | Zhou et al. | 455/436 |
| 2014/0127992 A1* | 5/2014 | Kuscher et al. | 455/41.1 |
| 2014/0254499 A1* | 9/2014 | Hassan et al. | 370/329 |
| 2014/0302785 A1* | 10/2014 | Arora et al. | 455/41.2 |
| 2015/0172968 A1* | 6/2015 | Lund et al. | 370/331 |
| 2015/0257077 A1* | 9/2015 | Sharony et al. | 370/331 |

FOREIGN PATENT DOCUMENTS

| | | |
|---|---|---|
| JP | 2011-044153 A | 3/2011 |
| JP | 2012-227610 A | 11/2012 |

\* cited by examiner

*Primary Examiner* — Warner Wong
(74) *Attorney, Agent, or Firm* — Knobbe Martens Olson & Bear LLP

(57) ABSTRACT

According to one embodiment, an electronic device includes a request module, a transmission module, and a connection module. The request module requests a tethering start for a terminal equipped with a tethering feature. The transmission module transmits a password for tethering to the terminal. The connection module connects the electronic device to a network via a tethering terminal.

19 Claims, 7 Drawing Sheets

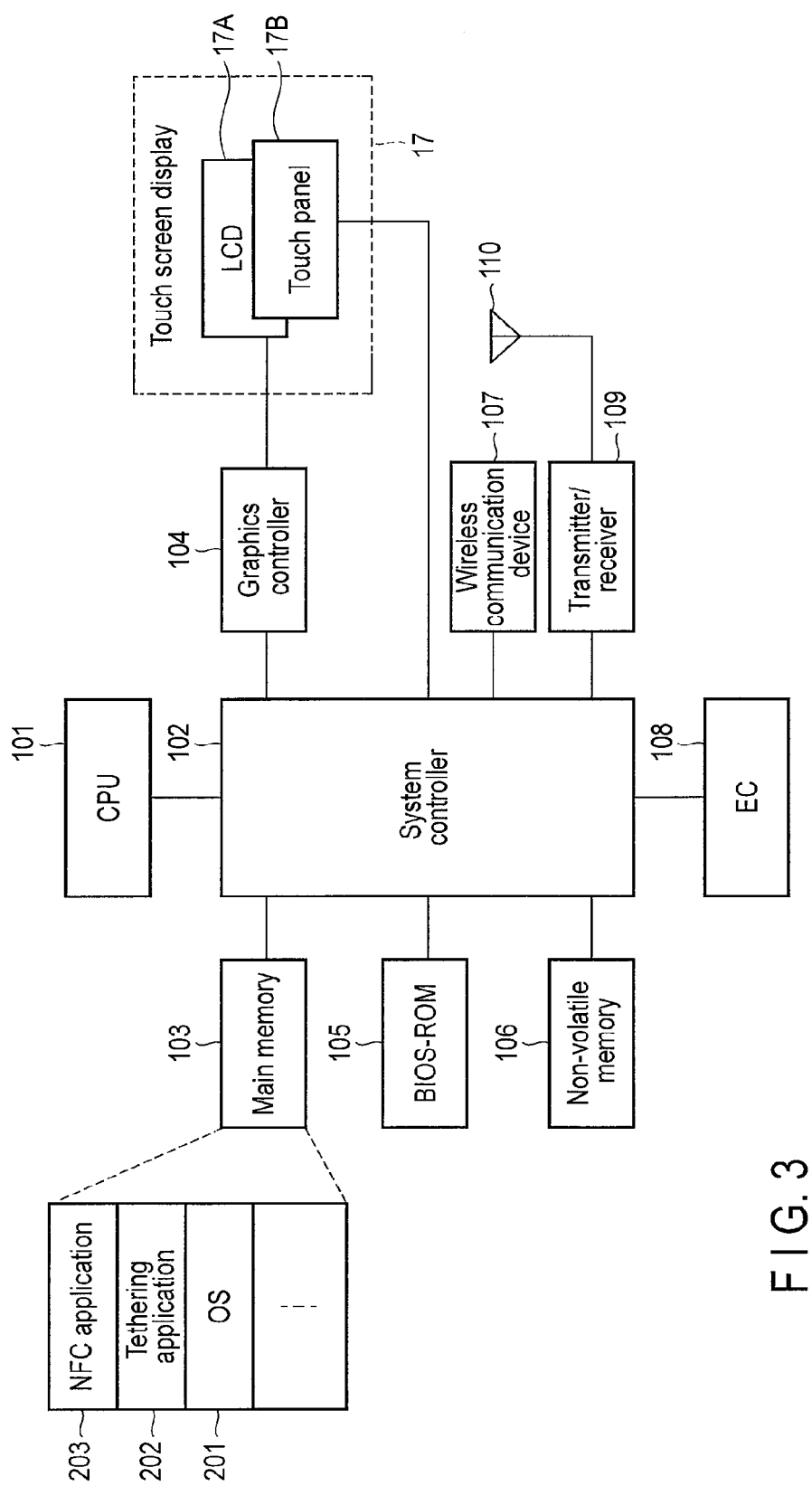
F I G. 3

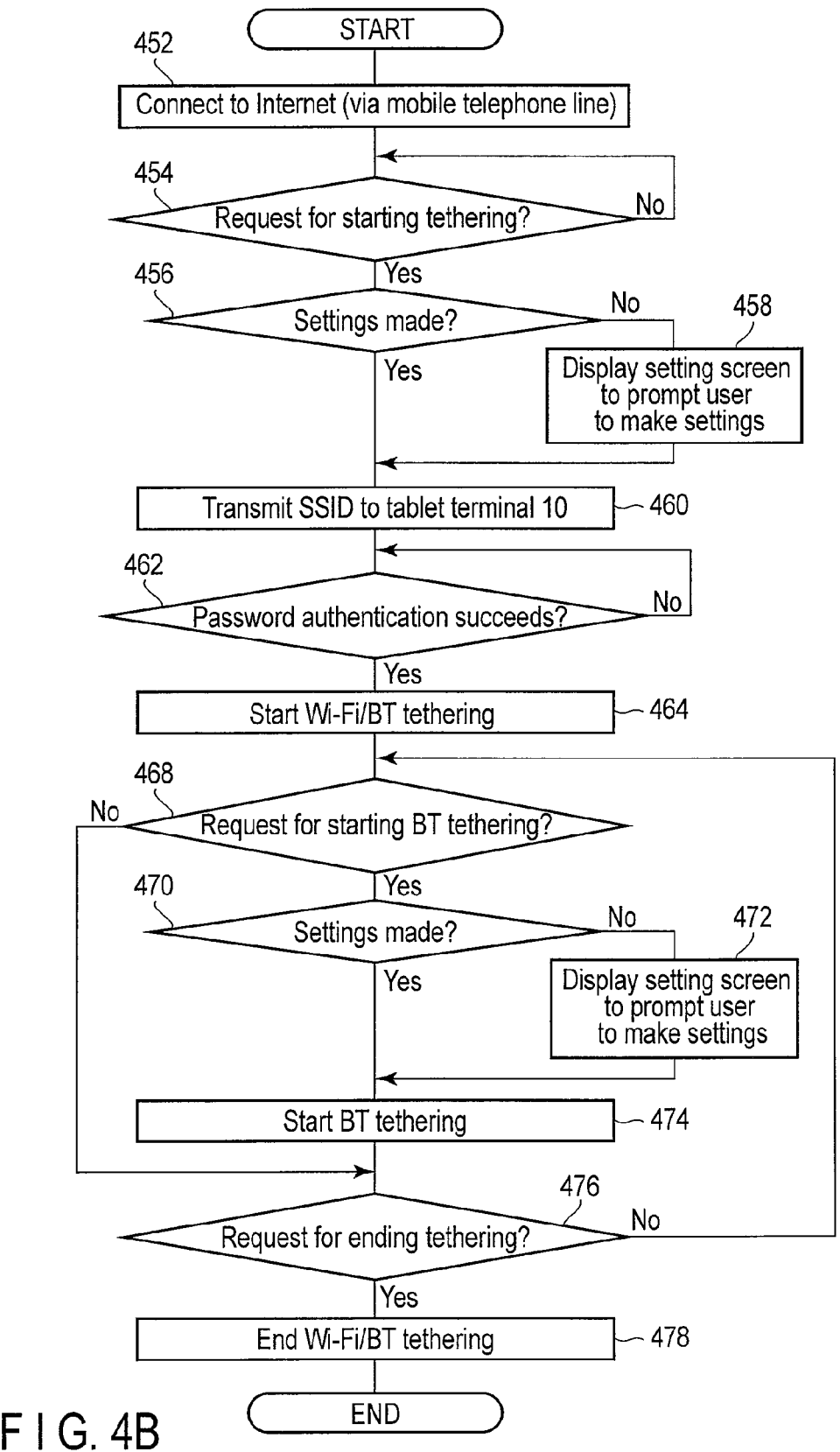
F I G. 4B

ELECTRONIC DEVICE, METHOD, AND COMPUTER-READABLE STORAGE MEDIUM

FIELD

Embodiments described herein relate generally to an electronic device, a method, and a computer-readable storage medium.

BACKGROUND

In recent years, there has been a growing demand for using the Internet outside the office by carrying a tablet terminal or a small-sized, lightweight PC. Usually, this type of tablet terminals and PCs are equipped with a wireless LAN feature, but not with a mobile telephone feature. It is therefore necessary to connect to an access point over wireless LAN (such as Wi-Fi and Bluetooth), in order to connect to a network outside the office.

Since an access point does not always exist nearby, it is not always possible to connect to a network.

Tethering is known as a technology for coping with such a situation. Tethering allows a PC or a tablet terminal (portable handset) not equipped with a mobile telephone feature to be connected to a network wirelessly using a device equipped with a mobile telephone feature, such as a smartphone, as an access point (base unit). The tethering feature, however, is not easy to use.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is a block diagram illustrating a configuration of a smartphone.

FIG. 4B is a flowchart illustrating a process of the smartphone in the system shown in FIGS. 1A and 1B.

DETAILED DESCRIPTION

Various embodiments will be described hereinafter with reference to the accompanying drawings.

In general, according to one embodiment, an electronic device includes a request module, a transmission module, and a connection module. The request module requests a tethering start for a terminal equipped with a tethering feature. The transmission module transmits a password for tethering to the terminal. The connection module connects the electronic device to a network via a tethering terminal.

An exemplary configuration of a system including an electronic device according to an embodiment will now be described with reference to FIGS. 1A and 1B. Assume that the user owns both a tablet terminal 10 (an example of the electronic device according to the embodiment) and a smartphone 12.

Figure 1A:
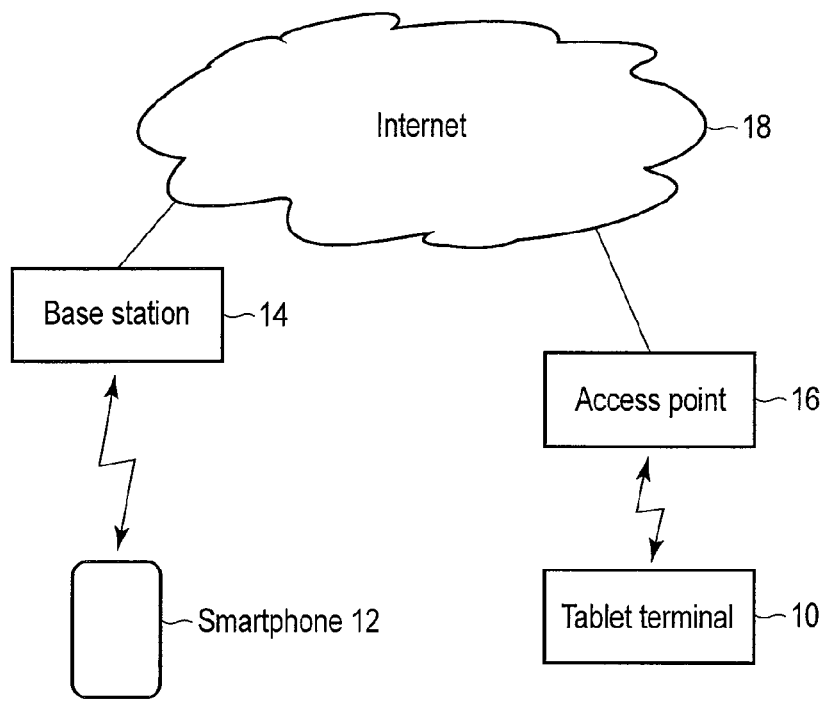
FIGS. 1A and 1B illustrate an exemplary configuration of a system including an electronic device according to an embodiment.

As shown in FIG. 1A, the smartphone 12 is connected to a base station 14 via a mobile telephone line such as a 3G line, and the tablet terminal 10 is connected to an access point 16 over wireless LAN (such as IEEE 802.11 and Wi-Fi). Thereby, both the tablet terminal 10 and the smartphone 12 can be connected to the Internet 18. At an initial stage, the smartphone 12 does not need to be connected to the Internet 18. The base station 14 of the mobile telephone is capable of emitting electric waves in a range from several hundred meters to several kilometers, whereas the access point 16 of a Wi-Fi line can emit electric waves only in a range from several meters to tens of meters. This is likely to cause a situation where the smartphone 12 is capable of receiving electric waves from the base station 14 but the tablet terminal 10 cannot receive electric waves from the access point 16, that is, the smartphone 12 is capable of connecting to the Internet but the tablet terminal 10 cannot connect to the Internet. In such a situation, by tethering the smartphone 12 connected to the Internet 18 via the base station 14 to the tablet terminal 10, as shown in FIG. 1B, the smartphone 12 acts as an access point (base unit) of the tablet terminal 10 (portable handset), and the tablet terminal 10 can be connected to the network via the smartphone 12.

Figure 2A:
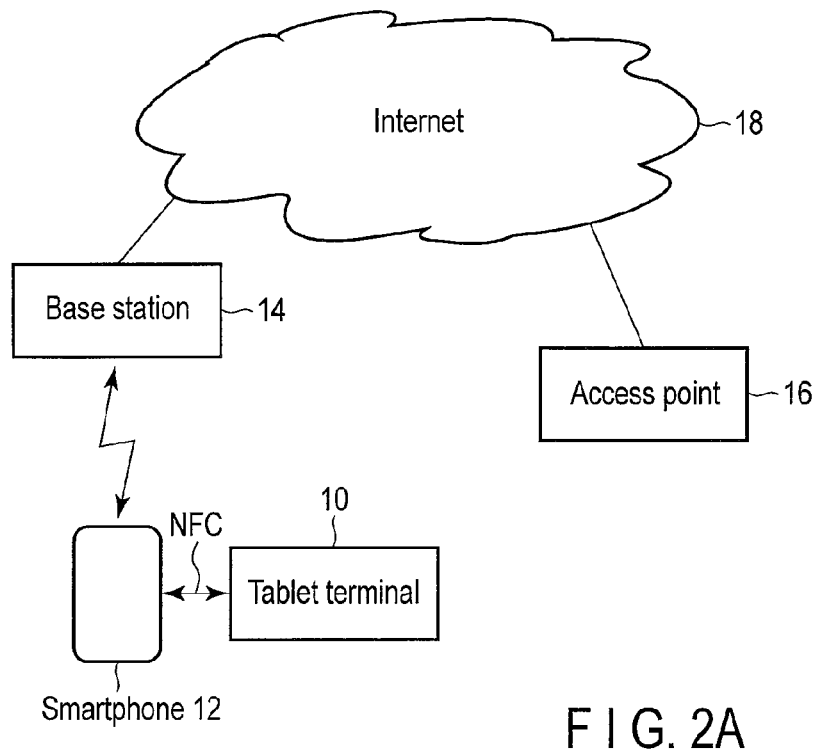
FIGS. 2A and 2B illustrate another exemplary configuration of the system including the electronic device according to the embodiment.
Figure 2B:
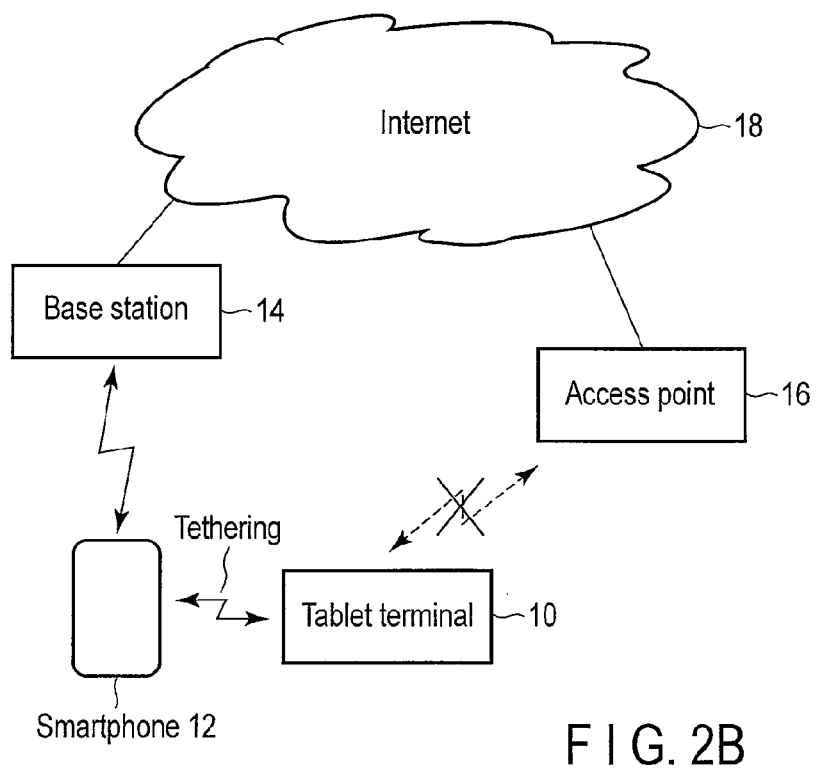

FIGS. 2A and 2B illustrate another exemplary configuration of the system including the electronic device according to the embodiment. In this example, too, assume that the user owns both the tablet terminal 10 and the smartphone 12. When only the smartphone 12 is connected to the Internet 18 as shown in FIG. 2A and the user is viewing a content on a small screen of the smartphone 12, there are cases where a request for viewing the content on a large screen of the tablet terminal 10 arises. The smartphone 12 and the tablet terminal 10 are equipped with a near field communication (NFC) feature, which uses the frequency band of 13.56 MHz. NFC allows data communications to be performed easily, simply by passing one device over the other, although the communication distance is limited to approximately 10 cm. When the NFC feature is turned on, by bringing another NFC-compatible terminal (tablet terminal 10) into close proximity, a URL of a web page, contact information in an address book, and the like being browsed on the smartphone 12 can be forwarded from the smartphone 12 to the tablet terminal 10, for example. The two terminals are brought into close proximity (usually with back sides facing each other), and a screen is tapped. What to transfer is determined by an application. Before data communications are started, it is necessary to confirm that the both terminals are unlocked, support near field communication (NFC), and enable NFC.

Thereby, a URL of the content being browsed on the smartphone 12 is transferred to the tablet terminal 10. In this case, the tablet terminal 10 attempts connection to the Internet on the basis of the URL. When the tablet terminal 10 is in a state of not being able to receive electric waves from the access point 16, however, by tethering the smartphone 12 connected to the Internet 18 to the tablet terminal 10 via the base station 14, as shown in FIG. 2B, the smartphone 12 acts as an access point (base unit) of the tablet terminal 10 (portable handset), and the tablet terminal 10 can be connected to the network via the smartphone 12. It is to be noted that FIG. 2B is the same as FIG. 1B.

FIG. 3 is a block diagram illustrating a configuration of the smartphone 12. The smartphone 12 includes a main body (not shown) including a flat, palm-sized, box-shaped housing and a touchscreen display 17 covering an upper surface of the main body. A liquid crystal display (LCD) 17A as a flat panel display and a sensor configured to detect a contact position of a stylus or a finger on a screen of the flat panel display are embedded in the touchscreen display 17. A capacitive touch panel 17B, for example, can be used as the sensor. The touch panel 17B is provided so as to cover the screen of the flat panel display 17A. The touchscreen display 17 is capable of detecting a touch operation on the screen using a finger.

The smartphone 12 includes a CPU 101, a system controller 102, a main memory 103, a graphics controller 105, a BIOS-ROM 105, a non-volatile memory 106, a wireless communication device 107, an embedded controller (EC) 108, a transmitter/receiver 109, an antenna 110, and the like.

The CPU 101 is a processor configured to control operation of each module in the smartphone 12. The CPU 101 executes a variety of types of software loaded from the non-volatile memory 106 as a storage device to the main memory 103. Such software includes an operating system (OS) 201, and a variety of application programs. The application programs include a tethering application program 202 and an NFC application program 203. The tethering application program 202 is equipped with a setting function for tethering and a function of enabling/disabling tethering. The NFC application program 203 is equipped with a setting function for transferring data over NFC, and a function of enabling/disabling NFC.

The CPU 101 performs the Basic Input/Output System (BIOS) stored in the BIOS-ROM 105. The BIOS is a program for controlling hardware.

The system controller 102 is a device that connects a local bus and a variety of components in the CPU 101. A memory controller that controls access of the main memory 103 is built into the system controller 102. The system controller 102 is equipped with a function of performing communications with the graphics controller 104 via a serial bus compatible with the PCI Express standard, for example.

The graphics controller 104 is a display controller configured to control the LCD 17A, which is used as a display monitor of the smartphone 12. A display signal generated by the graphics controller 104 is transmitted to the LCD 17A. The LCD 17A displays a screen image on the basis of the display signal.

The wireless communication device 107 is a device configured to perform wireless communications over wireless LAN. The EC 108 is a single-chip microcomputer including an embedded controller for power management. The EC 108 is equipped with a function of powering on or off the smartphone 12 according to an operation of the power button by the user. The transmitter/receiver 109 is a device configured to perform wireless communications via a mobile telephone line such as a 3G line, and is connected to the antenna 110.

Since the tablet terminal 10 has a configuration substantially the same as that of the smartphone 12, except that the transmitter/receiver 109 and the antenna 110 provided in the smartphone 12 are omitted, illustration of the configuration of the tablet terminal 10 will be omitted.

Next, operation of the embodiment will be described. A brief description will be given on tethering. Tethering refers to connecting an electronic device that is connected to a network over wireless LAN, instead of a mobile telephone line, to the Internet via a nearby device equipped with a mobile telephone feature and a wireless LAN feature, such as a smartphone, by using the nearby device as an access point (base unit), when an access point does not exist nearby, or when electric waves from an access point cannot be received. Tethering is a feature of an electronic device such as a smartphone. Therefore, even if the user does not own a Wi-Fi router, it is possible to connect a PC or a tablet terminal to the Internet whenever and wherever, only with a smartphone or the like, by using the smartphone as a Wi-Fi router.

Tethering can be divided into three types, according to the connection media between a PC or a tablet terminal and a smartphone. (i) Wi-Fi tethering: Tethering performed over wireless LAN for connection to a smartphone. (ii) Bluetooth (BT) tethering: Tethering performed over Bluetooth for connection to a smartphone. (iii) USB tethering: Tethering performed using a USB cable for connection to a smartphone.

Wi-Fi tethering allows connecting a plurality of Wi-Fi compatible devices simultaneously to a smartphone over wireless LAN for connection to the Internet. USB tethering allows tethering communications to be performed while a smartphone is being charged, and hence eliminates the need to care for the battery of the smartphone.

A description will be given on settings in a case where tethering is performed on an Android (registered trademark) smartphone (base unit), by way of example. For example, by tapping "Settings" icon on a home screen, a variety of setting items are displayed. By tapping "Wireless and Network" included therein, a variety of setting items are displayed. By tapping "Tethering" included therein, a variety of setting items are displayed. By tapping "Wi-Fi Tethering Settings" included therein, a checkbox for Wi-Fi tethering and item "Set Wi-Fi Tethering" are displayed. When the checkbox for Wi-Fi tethering is checked, Wi-Fi tethering is started, and when the checkbox is unchecked, the Wi-Fi tethering ends. By tapping "Set Wi-Fi Tethering", a Wi-Fi tethering setting screen is displayed. On the Wi-Fi tethering setting screen, (i) a network SSID, (ii) a security level, and (iii) a password are set. The network SSID is a name of a Wi-Fi access point, and can be arbitrarily set. The security level is selected from the following five types: "OPEN"; "WEP"; "WPA PSK"; "WPA2 PSK"; and "WPA/WPA2 PSK". The lowest security level is "OPEN", in which a password is not set and anyone can make connection. WEP is an abbreviation for Wired Equivalent Privacy, WPA is an abbreviation for Wi-Fi Protected Access, WPA2 is an abbreviation for Wi-Fi Protected Access 2, which is an updated version of WPA, and PSK is an abbreviation for a Pre-Shared key. The password can be arbitrarily set using 8 or more single-byte characters. By tapping "Save", the password is saved. Thereby, tethering settings of the smartphone (base unit) are completed.

After the settings, by returning to "Wi-Fi Tethering Settings" and checking the checkbox for Wi-Fi tethering, Wi-Fi tethering is started. Alternatively, the checkbox for Wi-Fi tethering can be always checked. It is preferable, however, to check the checkbox for Wi-Fi tethering when tethering is actually started, since the battery is consumed when the checkbox is checked even if tethering is not actually is performed.

BT tethering settings can be made in a similar manner. By tapping "Tethering", a variety of setting items are displayed. By tapping "BT Tethering Settings" included therein, a checkbox for BT tethering and item "Set BT Tethering" is displayed. When the checkbox for BT tethering is checked, BT tethering is started, and when the checkbox is unchecked, BT tethering ends. By tapping "Set BT Tethering", a BT tethering setting screen is displayed. On this screen, (i) a network SSID, (ii) a security level, and (iii) a password are set. By tapping "Save", the password is saved. Thereby, tethering settings of the tablet terminal (portable handset) are completed.

After the settings, by returning to "BT Tethering Settings" and checking the checkbox for BT tethering, BT tethering is started.

Next, settings of the tablet terminal (portable handset) will be described. By tapping an icon for wireless connection displayed on a taskbar on a screen of the tablet terminal, a list of access points that can be currently connected to is displayed. By selecting the network SSID of the smartphone set in advance therefrom and tapping the selected network SSID, "Connect automatically" button is displayed, and so the button is checked. On a password entry screen displayed thereafter, the password set in the base unit is entered. If the password is correct, tethering succeeds, and the tablet terminal as a portable handset is connected to the Internet via the smartphone as a base unit. It is to be noted that the smartphone 12 is capable of performing a voice call even during tethering.

Figure 1B:
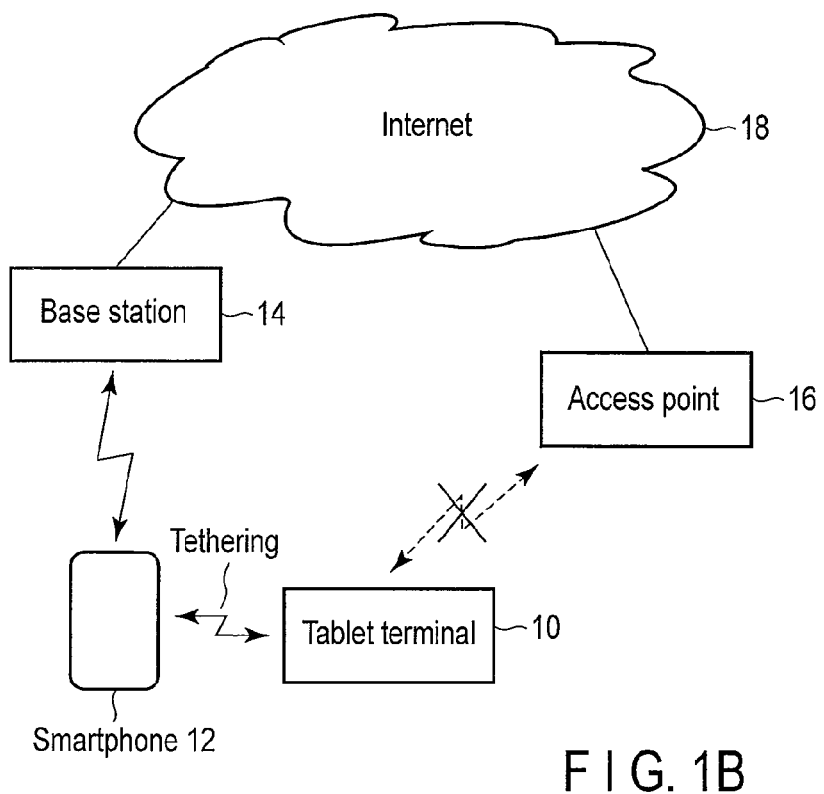
Figure 4A:
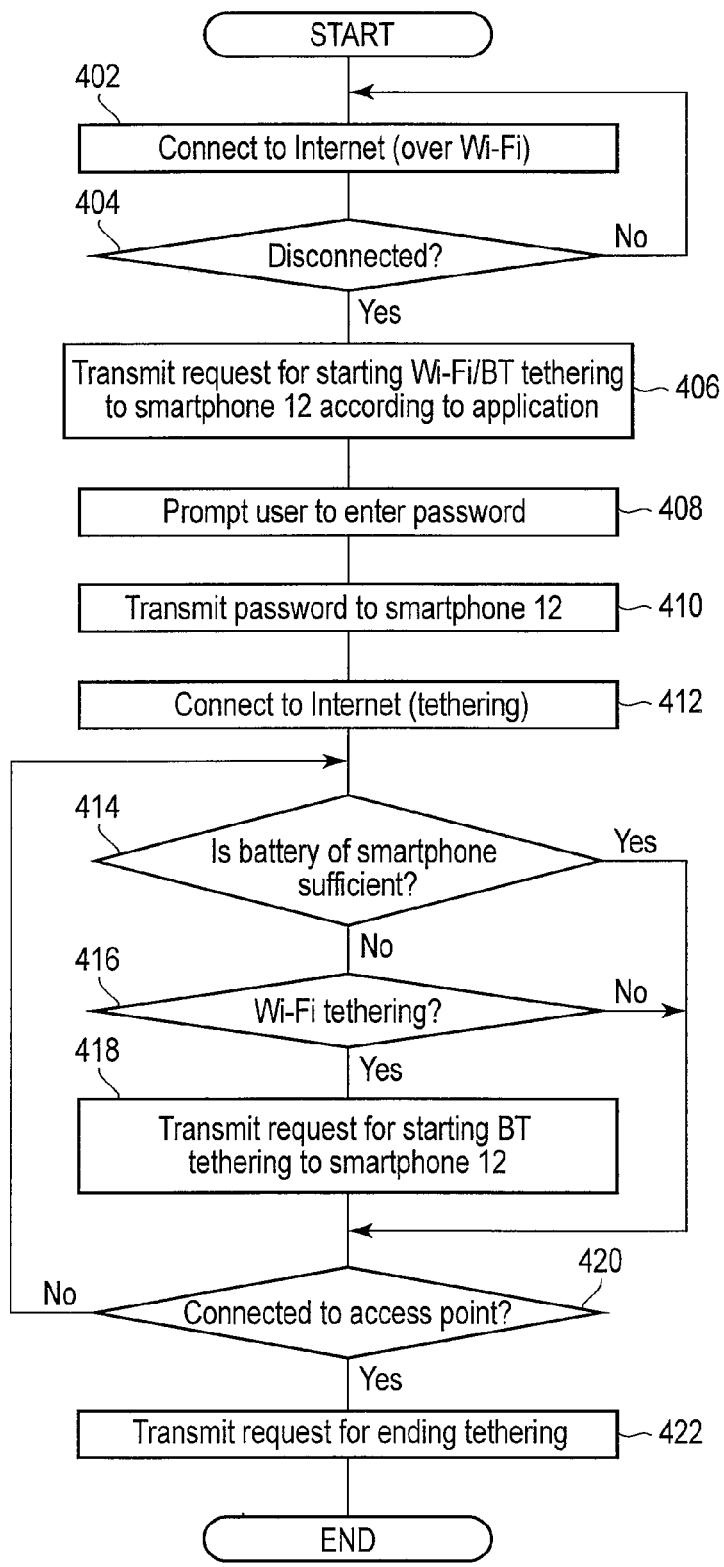
FIG. 4A is a flowchart illustrating a process of a tablet terminal in the system shown in FIGS. 1A and 1B.

FIG. 4A is a flowchart illustrating a process of the tablet terminal 10 and FIG. 4B is a flowchart illustrating a process of the smartphone 12 in the system shown in FIGS. 1A and 1B.

In block 402, the tablet terminal 10 is connected to the access point 16 over Wi-Fi for connection to the Internet. In block 452, the smartphone 12 is connected to the base station 14 via a mobile telephone line for connection to the Internet. The tablet terminal 10 and the smartphone 12 may access either the same website or different websites.

As shown in block 404, the tablet terminal 10 determines whether connection to the Internet is still active or has been broken on the basis of intensity of received electric waves from the access point 16. If intensity of the received electric waves is equal to or below a threshold value, the tablet terminal 10 determines that connection to the Internet has been broken.

When the tablet terminal 10 detects loss of connection to the Internet, the tablet terminal 10 transmits a request for starting tethering to the smartphone 12 in block 406, so as to continue connection to the Internet. Since the above-described tethering settings have been made in advance in the tablet terminal 10, the tablet terminal 10 is "automatically connected" to the network SSID of the smartphone 12. The tethering that is requested to start selects one of Wi-Fi tethering and BT tethering, according to an application that uses the Internet. If Wi-Fi tethering is selected, a request for starting tethering is transmitted to the smartphone 12 over Wi-Fi, and when BT tethering is selected, a request for starting tethering is transmitted to the smartphone 12 over BT. Since Wi-Fi tethering consumes a large amount of the battery of the smartphone 12, it is also possible to select BT tethering when a high speed is not required, and select Wi-Fi tethering only when absolutely necessary. For example, it is possible to select Wi-Fi tethering during execution of an application for viewing a moving image, and select BT tethering in other cases, for example, during browsing of a Web page.

The smartphone 12 determines whether a request for starting tethering has been received from the tablet terminal 10 or not in block 454. Determination of block 454 is repeated until a request for starting tethering is received. When a request for starting tethering is received, the smartphone 12 determines whether tethering settings have been made or not in block 456. That is, the smartphone 12 determines whether (i) a network SSID, (ii) a security level, and (iii) a password have been set. When the settings have not been made, the smartphone 12 displays a Wi-Fi/BT tethering setting screen in block 458, so as to prompt the user to make tethering settings.

When tethering settings of the smartphone 12 have been made in block 456, or after the user has completed tethering settings in block 458, the smartphone 12 transmits the SSID to the tablet terminal 10 in block 460.

Upon receipt of the SSID, the tablet terminal 10 displays a network SSID of the smartphone 12 and displays a password entry screen in block 408, so as to prompt the user to enter the password set in the smartphone 12. When a password is entered, the tablet terminal 10 transmits the password to the smartphone 12 in block 410.

The smartphone 12 checks whether the password transmitted from the tablet terminal 10 is correct or not in block 462. If the password is correct, the smartphone 12 automatically checks the checkbox for Wi-Fi/BT tethering in "Wi-Fi/BT Tethering Settings" in block 464, and starts Wi-Fi/BT tethering.

Thereby, as shown in block 412, the tablet terminal 10 is connected to the Internet via the smartphone 12 by means of Wi-Fi/BT tethering, and restarts browsing a content, which has been suspended since block 404, on the basis of browsing history.

The tablet terminal 10 determines whether the remaining amount of the battery of the smartphone 12 is sufficient or not in block 414, after start of tethering. When the remaining amount of the battery is sufficient, the tablet terminal 10 skips blocks 416 and 418 and performs block 420. When the remaining amount of the battery is not sufficient, the tablet terminal 10 determines whether the tethering being performed is Wi-Fi tethering or not in block 416. When the tethering being performed is not Wi-Fi tethering, the tablet terminal 10 skips block 418, and performs block 420. When the tethering being performed is Wi-Fi tethering, the tablet terminal 10 transmits a request for starting BT tethering to the smartphone 12 in block 418, in order to suppress power consumption of the battery.

The smartphone 12 determines in block 468 whether a request for starting BT tethering has been received from the tablet terminal 10 or not. When a request for starting BT tethering has not been received, the smartphone 12 skips blocks 470, 472 and 474, and performs block 476. When a request for starting BT tethering is received, the smartphone 12 determines whether BT tethering settings have been made or not in block 470. That is, the smartphone 12 determines whether (i) a network SSID, (ii) a security level, and (iii) a password have been set. When the settings have not been made, the smartphone 12 displays a BT tethering setting screen in block 472, so as to prompt the user to make BT tethering settings.

When BT settings have been made in block 470, or after the user has completed tethering settings in block 472, the smartphone 12 automatically checks a checkbox for BT tethering in "BT Tethering Settings" in block 474, and starts BT tethering.

During tethering, the tablet terminal 10 determines whether connection to the access point 16 over Wi-Fi has become available on the basis of intensity of received electric waves from the access point 16 in block 420. When it is determined that Wi-Fi connection has become available, the tablet terminal 10 transmits a request for ending tethering to the smartphone 12 in block 422.

The smartphone 12 determines in block 476 whether a request for ending tethering has been received from the tablet terminal 10 or not. When it is determined that a request for ending tethering has not been received, the flow returns to block 468. When a request for ending tethering is received, the smartphone 12 automatically unchecks the checkbox for Wi-Fi/BT tethering in "Wi-Fi/BT Tethering Settings" in block 478, and ends Wi-Fi/BT tethering.

Thereby, even when connection to the access point 16 over Wi-Fi has become unavailable while the tablet terminal 10 is using the Internet via the access point 16 over Wi-Fi, tethering can be started merely by transmitting a request for starting tethering to the smartphone 12 as long as the smartphone 12 exists nearby. It is possible to make settings in advance; however, even if settings have not been made in advance, a screen that prompts the user to make settings in accordance with the request for starting tethering is displayed, and so settings can be made easily by making entries in accordance with the displayed screen. FIG. 4A illustrates a case where the user is requested to enter a password at the start of tethering, but entry of a password is not always necessary since password authentication is not required in certain security levels. Further, even in a security level that requires password authentication, it is possible to skip entering the password by saving a password that has previously been entered in the tablet terminal 10.

Figure 5A:
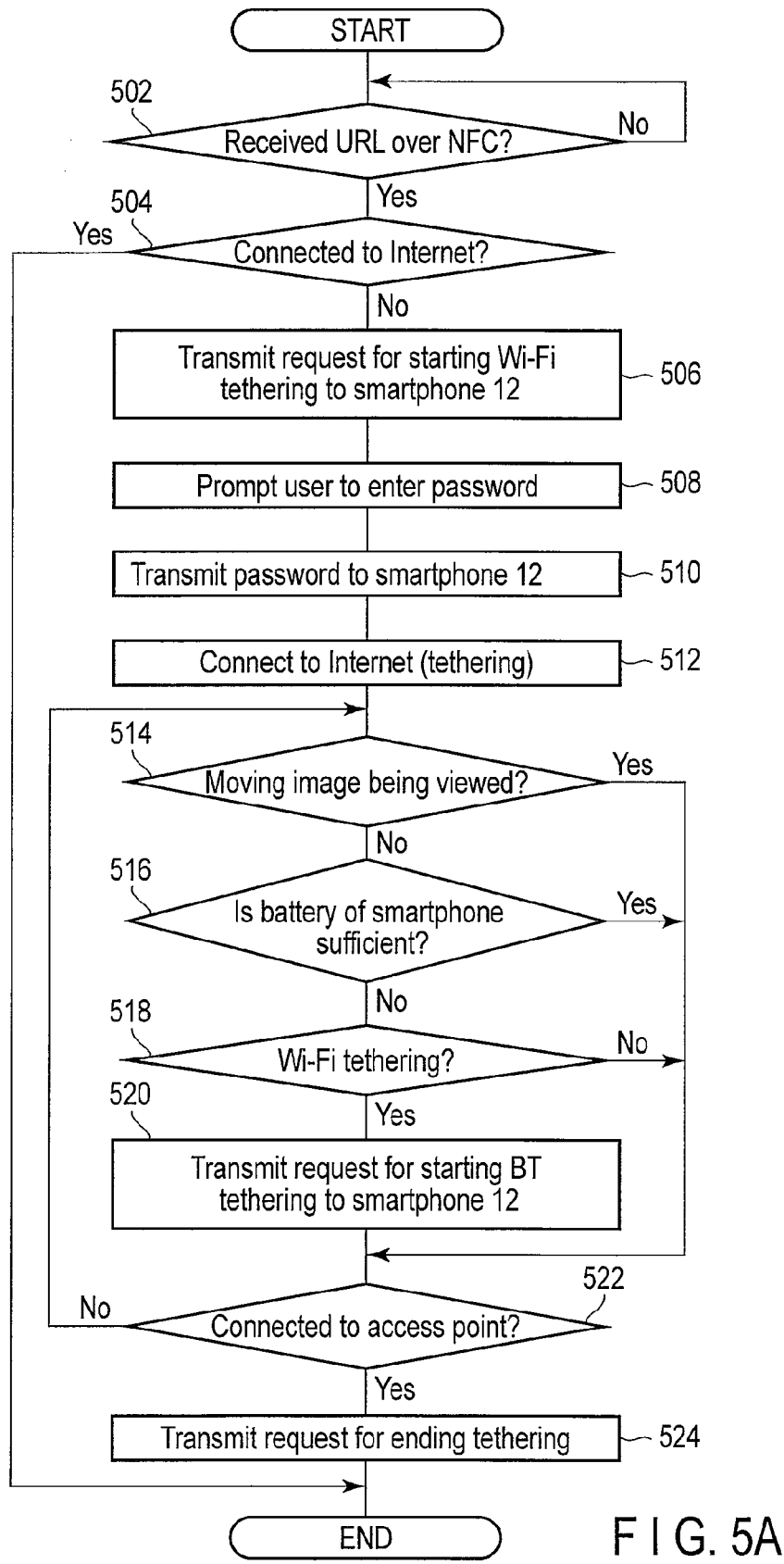
FIG. 5A is a flowchart illustrating a process of the tablet terminal in the system shown in FIGS. 2A and 2B.
Figure 5B:
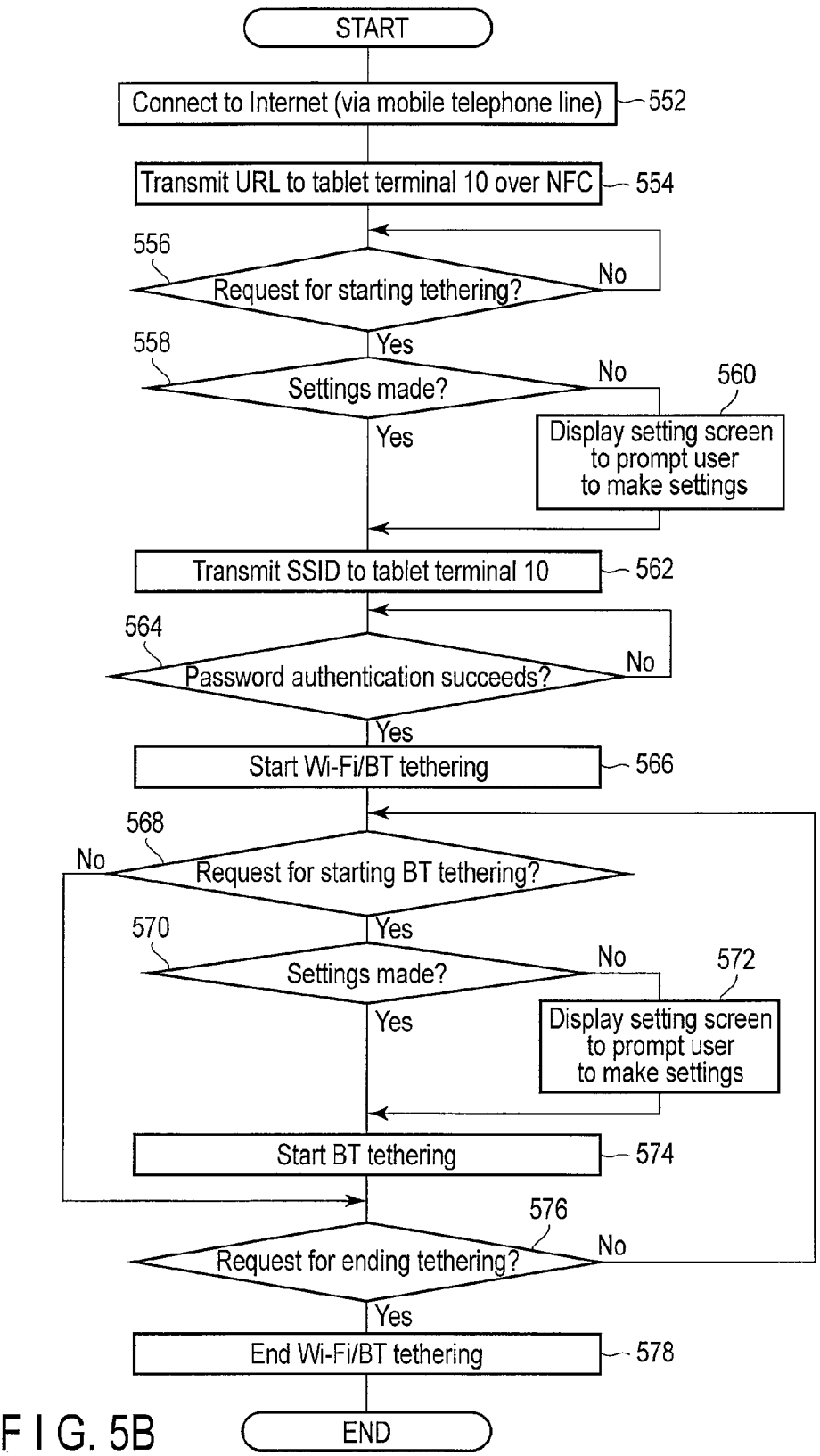
FIG. 5B is a flowchart illustrating a process of the smartphone in the system shown in FIGS. 2A and 2B.

FIG. 5A is a flowchart illustrating a process of the tablet terminal 10 and FIG. 5B is a flowchart illustrating a process of the smartphone 12 in the system shown in FIGS. 2A and 2B.

In the initial state, the tablet terminal 10 is not connected to the Internet. In block 552, the smartphone 12 is connected to the base station 14 via a mobile telephone line for connection to the Internet. In order to browse a content being browsed on the smartphone 12 on the tablet terminal 10, the smartphone 12 transmits a URL to the tablet terminal 10 over NFC in block 554. More specifically, the two terminals are brought into close proximity (usually with back sides facing each other), and a screen of the smartphone 12 is tapped.

The tablet terminal 10 determines whether a URL has been received over NFC from the smartphone 12 in block 502. Block 502 is repeated until a URL is received. When a URL is received, the tablet terminal 10 determines whether connection to the Internet has been established in block 504. When connection to the Internet has been established, the tablet terminal 10 ends the process without performing anything.

When connection to the Internet is not established, the tablet terminal 10 transmits a request for starting Wi-Fi tethering to the smartphone 12 in block 506, so as to start connection to the Internet. It is assumed that the above-described tethering settings have been made in advance in the tablet terminal 10 and the tablet terminal 10 is "automatically connected" to the network SSID of the smartphone 12.

The smartphone 12 determines whether a request for starting Wi-Fi tethering has been received from the tablet terminal 10 or not in block 556. Determination of block 556 is repeated until a request for starting tethering is received. When a request for starting tethering is received, the smartphone 12 determines whether tethering settings have been made or not in block 558. That is, the smartphone 12 determines whether (i) a network SSID, (ii) a security level, and (iii) a password have been set or not. When the settings have not been made, the smartphone 12 displays a Wi-Fi tethering setting screen in block 560, so as to prompt the user to make tethering settings.

When tethering settings of the smartphone 12 have been made in block 558, or after the user has completed tethering settings in block 560, the smartphone 12 transmits the SSID to the tablet terminal 10 in block 562.

When the SSID is received, the tablet terminal 10 displays the network SSID of the smartphone 12 and a password entry screen in block 508, so as to prompt the user to enter the password set in the smartphone 12. When a password is entered, the tablet terminal 10 transmits the password to the smartphone 12 in block 510.

The smartphone 12 checks whether the password transmitted from the tablet terminal 10 is correct or not in block 564. If the password is correct, the smartphone 12 automatically checks the checkbox for Wi-Fi tethering in "Wi-Fi Tethering Settings" and starts Wi-Fi tethering in block 566.

Thereby, as shown in block 512, the tablet terminal 10 is connected to the Internet via the smartphone 12 by means of Wi-Fi tethering, and starts browsing a content on the basis of the URL being browsed on the smartphone 12, which has been received in block 502.

After start of tethering, the tablet terminal 10 determines whether a moving image content is being viewed in block 514. When a moving image content is being viewed, the tablet terminal 10 skips blocks 516, 518 and 520 and moves straight to block 522. When a moving image content is not being viewed, the tablet terminal 10 determines whether the remaining amount of the battery of the smartphone 12 is sufficient or not in block 516. When the remaining amount of the battery is sufficient, the tablet terminal 10 skips blocks 518 and 520 and performs block 522. When the remaining amount of the battery is not sufficient, the tablet terminal 10 determines whether the tethering being performed is Wi-Fi tethering or not in block 518. When the tethering being performed is not Wi-Fi tethering, the tablet terminal 10 skips block 520, and performs block 522. When the tethering being performed is Wi-Fi tethering, the tablet terminal 10 transmits a request for starting BT tethering to the smartphone 12 in block 520, in order to suppress power consumption of the battery.

The smartphone 12 determines whether a request for starting BT tethering has been received from the tablet terminal 10 or not in block 568. When a request for starting BT tethering has not been received, the smartphone 12 skips blocks 570, 572 and 574 and performs block 576. When a request for starting BT tethering is received, the smartphone 12 determines whether BT settings have been made in block 570. That is, the smartphone 12 determines whether (i) a network SSID, (ii) a security level, and (iii) a password have been set or not. When the settings have not been made, the smartphone 12 displays a BT tethering setting screen in block 572, so as to prompt the user to make BT tethering settings.

When BT tethering settings have been made in block 570, or after the user has completed tethering settings in block 572, the smartphone 12 automatically checks the checkbox for BT tethering in "BT Tethering Settings" and starts BT tethering in block 574.

During tethering, the tablet terminal 10 determines whether connection to the access point 16 over Wi-Fi has become available, on the basis of intensity of received electric waves from the access point 16 in block 522. When it is determined that Wi-Fi connection has become available, the tablet terminal 10 transmits a request for ending tethering to the smartphone 12 in block 524.

The smartphone 12 determines whether a request for ending tethering has been received from the tablet terminal 10 or not in block 576. If a request for ending tethering has not been received, the flow returns to block 568. When a request for ending tethering is received, the smartphone 12 automatically unchecks the checkbox for Wi-Fi/BT tethering in "Wi-Fi/BT Tethering Settings" in block 578, and ends Wi-Fi/BT tethering.

By forwarding a URL of a web page being viewed by the smartphone 12 to the tablet terminal 10 over NFC while only the smartphone 12 is connected to the Internet 18 and a content is being viewed on a small screen of the smartphone 12, even if the tablet terminal 10 is in a state of not being able to receive electric waves from the access point 16, it is possible to start tethering merely by transmitting a request for starting tethering to the smartphone 12 as long as the smartphone 12 exists nearby. Settings can be made in advance, but even if settings have not been made in advance, a screen that prompts the user to make settings in accordance with a request for starting tethering is displayed, and so settings can be made easily by making entries in accordance with the displayed screen. FIG. 5A illustrates a case where the user is requested to enter a password at the start of tethering, but entry of a password is not always necessary since password authentication is not required in certain security levels. Further, even in a security level that requires password authentication, it is possible to skip entering a password by saving a password that has previously been entered.

As described above, according to the embodiment, even if an electronic device, such as a tablet terminal and a PC, which is equipped with a wireless LAN feature but not with a mobile telephone feature, cannot connect to an access point over wireless LAN (such as Wi-Fi and Bluetooth), it is possible to automatically start tethering simply by transmitting a request for starting tethering to another electronic device, such as a smartphone, which is equipped with both a wireless LAN feature and a portable telephone feature. It is possible to easily connect an electronic device (portable handset), such as a PC and a tablet terminal, to a network by using the said another electronic device as an access point (base unit).

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

For example, a tablet terminal has been described as an example of the electronic device, but may be replaced with a PC, a handheld game machine, a PDA, or the like. Further, Wi-Fi connection has been described as an example of wireless connection to the access point, but may be replaced with Wimax connection or the like. Moreover, in the above-described example, when the electronic device (tablet) determines that the remaining amount of the battery of the tethering terminal (smartphone) is small, a request for switching from Wi-Fi tethering to BT tethering, which requires low power consumption, is made, but the tethering terminal itself may check the remaining amount of the battery and switch from Wi-Fi tethering to BT tethering.

What is claimed is:

1. An electronic device configured to connect to a network using an access point, said electronic device comprising:
a transmission hardware element configured to transmit a password for tethering to a terminal equipped with a tethering feature, wherein said terminal includes a second transmission hardware element configured for mobile telephony communications with a base station; and
circuitry configured to:
request a tethering start for the terminal equipped with the tethering feature;
connect an electronic device to the network via the terminal,
determine, during tethering, whether connection to the network can be established using the access point; and
transmit a request for ending the tethering when the connection can be established using the access point.

2. The electronic device of claim 1, wherein the circuitry is configured to transmit the request for tethering when connection between the electronic device and the network is broken.

3. The electronic device of claim 1, wherein the circuitry is configured to selectively request a start of tethering over wireless LAN or a start of tethering over near field communication in accordance with an application being executed in the electronic device before the connection between the electronic device and the network is broken.

4. The electronic device of claim 1, wherein the circuitry is configured to transmit a request for tethering over wireless LAN when an application for viewing a moving image is being executed and a request for tethering over near field communication when an application for browsing a web page is being executed.

5. The electronic device of claim 1, wherein the request for tethering causes the terminal to display a setting screen when settings for tethering have not been made in the terminal.

6. The electronic device of claim 1, wherein the electronic device checks a remaining amount of a battery of the terminal during tethering and when the remaining amount is equal to or below a predetermined level, the electronic device is configured to transmit the request for tethering over near field communication.

7. The electronic device of claim 1, wherein the circuitry is configured to transmit the request for tethering to the terminal when a URL is transmitted from another device and connection to the network is broken.

8. A method for connecting an electronic device to a network, said electronic device is configured to connect to the network using an access point, said method comprising:
transmitting a request for tethering to a terminal equipped with a tethering feature, wherein said terminal includes a second transmission hardware element configured for mobile telephony communications with a base station;
transmitting a password for tethering to the terminal;
requesting a tethering start for the terminal;
connecting an electronic device to the network via the terminal;
determining, during tethering, whether connection to the network can be established using the access point; and
transmitting a request for ending the tethering when the connection can be established using the access point.

9. The method of claim 8, further comprising:
transmitting a request for tethering over wireless LAN when an application for viewing a moving image is being executed; and
transmitting a request for tethering over near field communication when an application for browsing a web page is being executed.

10. The method of claim 9, further comprising transmitting the request for tethering over wireless LAN or over near field communication when connection between the electronic device and the network is broken.

11. The method of claim 9, wherein the request for tethering causes the terminal to display a setting screen when settings for tethering have not been made in the terminal.

12. The method of claim 9, further comprising:
checking a remaining amount of a battery of the terminal during tethering; and
transmitting the request for tethering over near field communication when the remaining amount is equal to or below a predetermined level.

13. The method of claim 9, further comprising transmitting the request for tethering to the terminal when a URL is transmitted from another device and connection to the network is broken.

14. The method of claim 8, wherein
the request for tethering comprises a request for tethering over wireless LAN or a request for tethering over near field communication, and
one of the request for tethering over wireless LAN and the request for tethering over near field communication is transmitted in accordance with a type of an application being executed in the electronic device before the connection between the electronic device and the network is broken.

15. An electronic device configured to connect to a network using an access point, said electronic device comprising a computer-readable non-transitory storage medium storing instructions which, when executed, causes the electronic device to:
   transmit a request for tethering to a terminal equipped with a tethering feature, wherein said terminal includes a second transmission hardware element configured for mobile telephony communications with a base station;
   transmit a password for tethering to the terminal;
   request a tethering start for the terminal;
   connect to a network via the terminal;
   determine, during tethering, whether connection to the network can be established using the access point; and
   transmit a request for ending the tethering when the connection can be established using the access point.

16. The storage medium of claim 15, further comprising:
   transmitting a request for tethering over wireless LAN when an application for viewing a moving image is being executed; and
   transmitting a request for tethering over near field communication when an application for browsing a web page is being executed.

17. The storage medium of claim 16, wherein the request for tethering causes the terminal to display a setting screen when settings for tethering have not been made in the terminal.

18. The storage medium of claim 16, further comprising:
   checking a remaining amount of a battery of the terminal during tethering; and
   transmitting the request for tethering over near field communication when the remaining amount is equal to or below a predetermined level.

19. The storage medium of claim 15, wherein
the request for tethering comprises a request for tethering over wireless LAN or a request for tethering over near field communication, and
one of the request for tethering over wireless LAN and the request for tethering over near field communication is transmitted in accordance with a type of an application being executed in the electronic device before the connection between the electronic device and the network is broken.

* * * * *